United States Patent [19]

Burton et al.

[11] Patent Number: 4,814,712
[45] Date of Patent: Mar. 21, 1989

[54] TEST KIT FOR A CIRCUIT BREAKER CONTAINING AN ELECTRONIC TRIP UNIT

[75] Inventors: Thomas D. Burton, Unionville; Indrajit Purkayastha, Weatogue, both of Conn.

[73] Assignee: General Electric Company, New York, N.Y.

[21] Appl. No.: 63,181

[22] Filed: Jun. 17, 1987

[51] Int. Cl.$^4$ .............................................. G01R 31/32
[52] U.S. Cl. ...................................... 324/424; 361/115
[58] Field of Search ........................... 324/424, 158 R; 340/638; 364/480, 483, 492; 361/78, 79, 89, 91, 93, 102, 105, 115, 106, 96, 97

[56] References Cited

U.S. PATENT DOCUMENTS

| 4,105,965 | 8/1978 | Russell | 324/424 |
|---|---|---|---|
| 4,128,804 | 12/1978 | Russell | 324/424 |
| 4,209,739 | 6/1980 | Paice | 324/424 |
| 4,266,259 | 5/1981 | Howell | 361/97 |
| 4,351,013 | 9/1982 | Matsko et al. | 361/96 |
| 4,428,022 | 1/1984 | Engel et al. | 324/424 X |
| 4,556,882 | 12/1985 | Brifman et al. | 340/638 X |
| 4,560,936 | 12/1985 | Pelowski | 324/424 X |
| 4,589,052 | 5/1986 | Dougherty | 361/94 |
| 4,649,455 | 3/1987 | Scott | 361/93 |

FOREIGN PATENT DOCUMENTS 2118310 10/1983 United Kingdom ................ 324/424

OTHER PUBLICATIONS

May, "Electronics' Role in Circuit Protection", *The Electrical Distributor*, Feb. 1986, pp. 248-252.
May, "Electronics' Role in Circuit Protection", *The Electrical Distriburor*, Mar. 1986, pp. 62-70.

*Primary Examiner*—Reinhard J. Eisenzopf
*Assistant Examiner*—Warren S. Edmonds
*Attorney, Agent, or Firm*—Richard A. Menelly; Walter C. Bernkopf; Fred Jacob

[57] ABSTRACT

A test kit for a digital and analog electronic circuit breaker determines the calibration and overcurrent response of the circuit breaker when connected within an electric power circuit. The test kit simulates an overcurrent condition and provides verification of the circuit breaker response without de-energizing the circuit breaker or interfering with the circuit breaker's protection functions. The test kit connects with the digital communications circuit within the digital circuit breaker to obtain status information concerning pick-up conditions, trip conditions and fault currents which are viewed on the test kit liquid crystal display. A ground fault suppression circuit is included within the test kit for single-phase current-injection without causing ground fault tripping. The test kit circuit further includes means for optionally tripping the circuit breaker upon completion of any of the tests.

11 Claims, 5 Drawing Sheets

TEST KIT FOR A CIRCUIT BREAKER CONTAINING AN ELECTRONIC TRIP UNIT

BACKGROUND OF THE INVENTION

When circuit breakers are connected within electrical power systems for protecting the main and branch circuits, it is necessary to periodically determine whether the circuit breakers are operating properly. With electronic type circuit breakers employing an analog circuit processor such as described within U.S. Pat. No. 4,266,259 a field-test kit is temporarily connected with the electronic trip unit circuit to test the overcurrent response of the individual circuit breakers connected within the system. U.S. Pat. No. 4,105,965 describes one such test kit employed with electronic circuit breakers which contain an analog signal processor within its trip unit circuit. U.S. Pat. No. 4,128,804 describes a field-test kit used with electronic circuit breakers employing an analog signal processor within the trip unit circuit along with a ground fault sensing circuit, to inhibit a ground fault trip function, when the test kit circuit is performing a single-phase current test.

With electronic circuit breakers employing digital signal processors within the trip unit circuit, such as described in U.S. Pat. No. 4,351,013 and U.S. Pat. No. 4,672,501 entitled "Circuit Breaker and Protective Relay Unit", it is convenient to include a self-test program within the microprocessor connected within the trip unit circuit.

With electronic circuit breakers such as described in U.S. Pat. Nos. 4,589,052 and 4,649,455 which employ a digital processor in the trip unit circuit but do not employ a microprocessor, per se, an external test kit is used to determine the operating parameters and response characteristics of the trip unit circuits. All of the aforementioned U.S. Patents are incorporated herein for reference purposes. One purpose of the instant invention is to describe a test kit and test circuit that is capable of testing electronic circuit breakers employing either a digital processor or an analog processor within the trip unit circuit.

SUMMARY OF THE INVENTION

A test kit for testing electronic circuit breakers installed within a power system determines the circuit breaker's operability without de-energizing the power system. The test kit circuit simulates an overcurrent condition and provides verification of the time-overcurrent characteristics of the digital processor within a circuit breaker digital trip unit circuit. Additionally, the test kit can provide a trip signal to the circuit breaker circuit over a digital communications circuit to trip the breaker, if so desired. The test kit also provides means for digitally suppressing the ground fault option in the circuit breaker trip unit. Information concerning the circuit breaker pick-up conditions, trip conditions and fault currents are indicated on the test kit liquid crystal display without interfering with the on-line protection function of the circuit breaker.

DESCRIPTION OF THE PREFERRED EMBODIMENT

Figure 1:
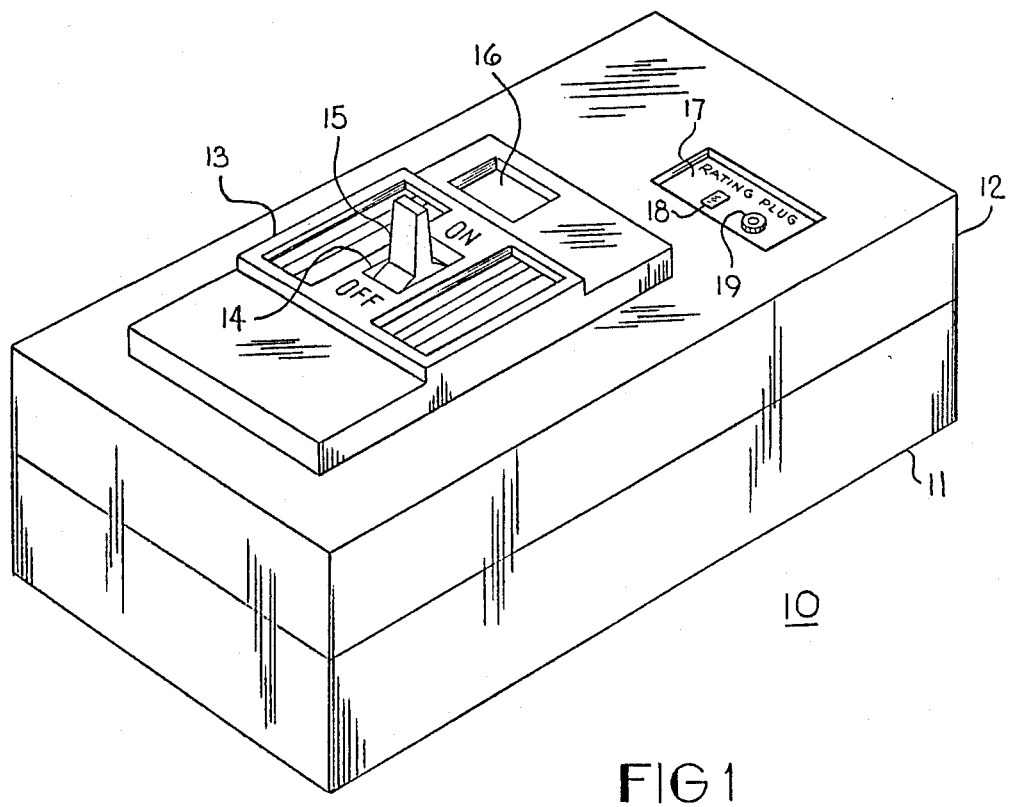
FIG. 1 is a top perspective view of an integrated circuit breaker having a rating plug and a test jack accessible from the top surface of the integrated circuit breaker cover.

An integrated circuit breaker 10 which provides overcurrent protection function along with at least one accessory function is shown in FIG. 1 to consist of a case 11 and a cover 12 made from a molded plastic material. An operating handle 15 for turning the circuit breaker between its "ON" and "OFF" positions passes through an opening 14 formed in the escutcheon 13 which is integral with and raised slightly above the cover 12. An accessory access door 16 is arranged within the escutcheon for field-installation of a selected accessory unit. The disclosure of an accessory door molded within a circuit breaker cover is found within U.S. patent application Ser. No. 061,244 filed June 12, 1987, which Application is incorporated herein for purposes of reference. Also arranged within the circuit breaker cover, is a rating plug 17 which includes a light-emitting diode 18 and a test jack access opening 19. A good description of the rating plug is found within U.S. Pat. No. 4,728,914, which Patent is incorporated herein for purposes of reference.

Figure 2:
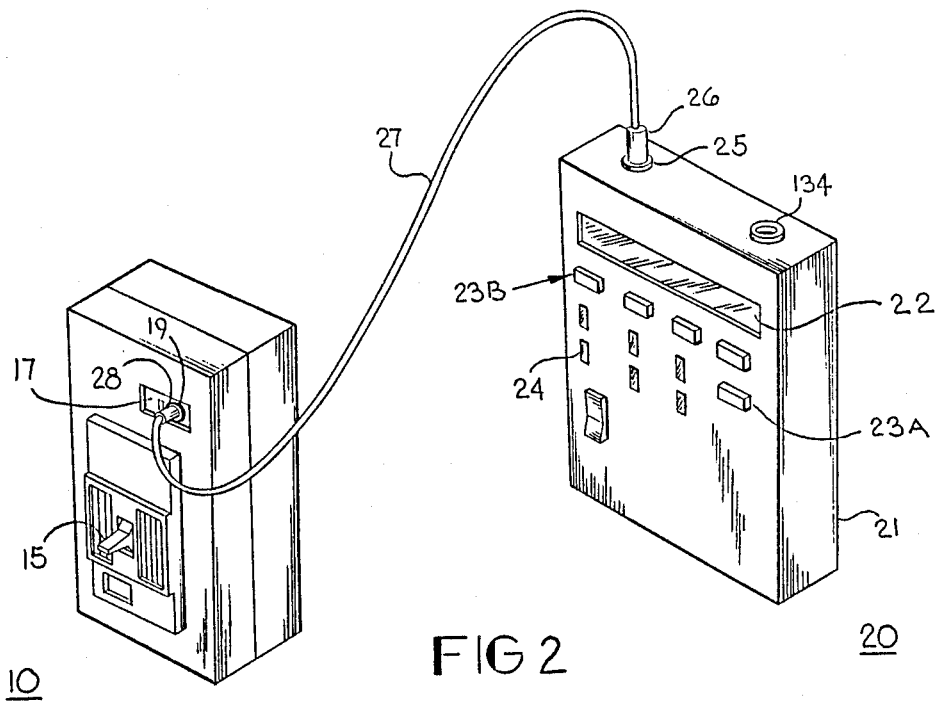
FIG. 2 is a front perspective view of a test kit, according to the: invention, connected with the integrated circuit breaker depicted in FIG. 1.

The test jack access opening 19 provides temporary electrical connection between a test kit 20, shown in FIG. 2, by the insertion of a plug connector 26, arranged at one end of a flexible cable 27, within a test jack access opening 25 formed within the test kit enclosure 21 and inserting a plug connector 28 connected to the other end of the flexible cable within a test jack access opening 19 arranged within the rating plug 17 shown earlier in FIG. 1. The test kit includes a plurality of buttons 23A, 23B arranged on the exterior of the enclosure, and a plurality of light-emitting diodes 24 to indicate the particular test function selected by means of a test button. A liquid crystal display (LCD) 22 provides alpha-numeric readout of the trip settings contained within the integrated circuit breaker 10. The test kit is operational whether the circuit breaker handle 15 is on its "ON" or "OFF" position and whether the integrated circuit breaker is electrically connected within an electric circuit.

Figure 3:
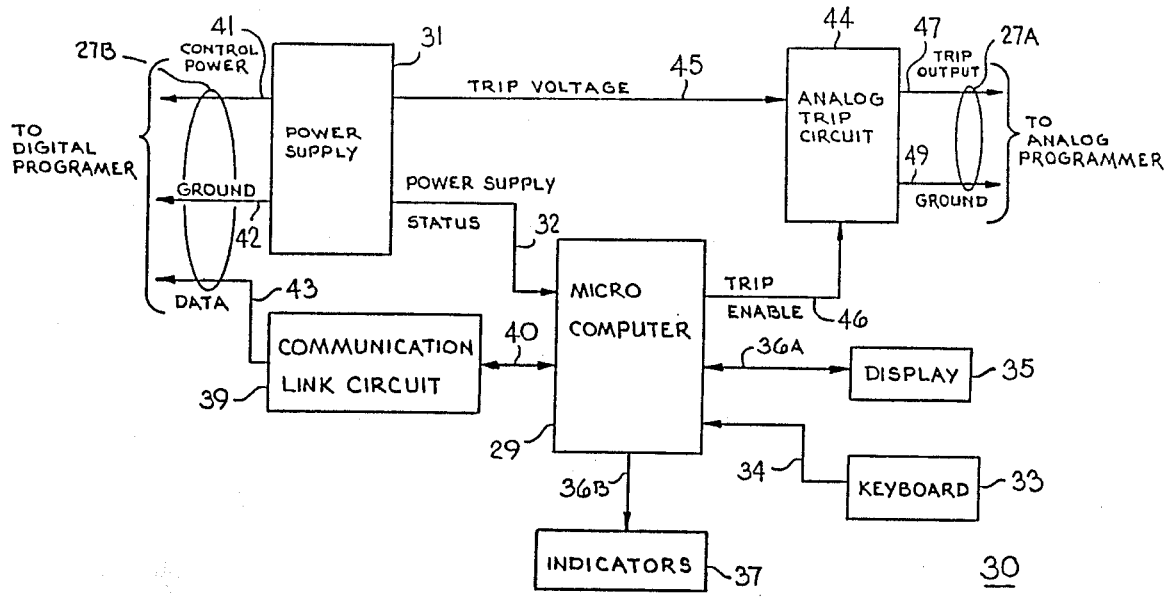
FIG. 3 is a diagrammatic representation of the electric circuit contained within the test kit of FIG. 2.

The operation of the circuit components contained within the test kit 20 can be seen by referring now to both FIG. 2 and FIG. 3. The buttons 23B on the test kit control the keyboard circuit 33 within the test circuit 30. The keyboard circuit connects with a microcomputer 29 over bus 34 which in turn communicates with an indicator circuit 37 over data bus 36B to operate the light-emitting diodes 24 on the test kit. The microcomputer communicates with a display circuit 35 over data bus 36A to operate the LCD 22 on the test kit. Operational power to the test circuit is provided by means of a power supply 31. Power supply status data is supplied to the microcomputer over conductor 32 while a trip signal is supplied to an analog trip circuit 44 over conductor 45. An analog signal processor (not shown) contained within an electronic circuit breaker trip unit, accumulates circuit information on a continuous time basis. One example being the charging of a capacitor to determine time-overcurrent before initiating a trip function as described earlier. A trip enable signal is supplied to the analog trip circuit 44 from the microcomputer over conductor 46. The trip output signal is inputted to the analog signal processor within the electronic circuit breaker trip unit circuit over conductor 47. Ground connection with the circuit breaker trip unit circuit is made over conductor 49. The trip output conductor 47 and ground conductor 49, included within the test conductor cable 27A depicted in FIG. 3, connect with the rating plug test jack connector 19 when the trip unit within the integrated circuit breaker 10 includes an analog signal processor. When the trip unit circuit contained within the integrated circuit breaker includes a digital processor (not shown), such as a microprocessor for processing circuit information in discrete rather than continuous intervals, a communication circuit 39 connects with the test circuit microcomputer 29 over data bus 40 and connects with the integrated circuit breaker over conductor 43. The control power conductor 41, ground conductor 42 and data bus 43 are contained within a test conductor cable 27B and connect with the test jack 19 of the integrated circuit breaker 10. The microcomputer 29, within the test unit circuit 30 allows the test circuit to perform a wide variety of test functions. One important function, for example, is to verify whether the digital processor within the integrated circuit breaker is functioning, by receiving status messages from the digital processor over the communications data bus 43, and displaying the results on the test kit LCD 22 to inform the operator of the test results. By operation of external buttons 23B on the test kit, the digital processor within the test kit is instructed to verify the trip settings and the option settings stored within the integrated circuit breaker and display the settings on the LCD 22. The light-emitting diodes (LED'S) 24 indicate which of the selected test functions are being performed in response to operation of the buttons 23A, 23B on the test kit while the LCD 22 displays the test results. For example, the test kit microcomputer could simulate an overcurrent condition and could optionally request that the integrated circuit breaker interrupt the circuit.

Figure 6:
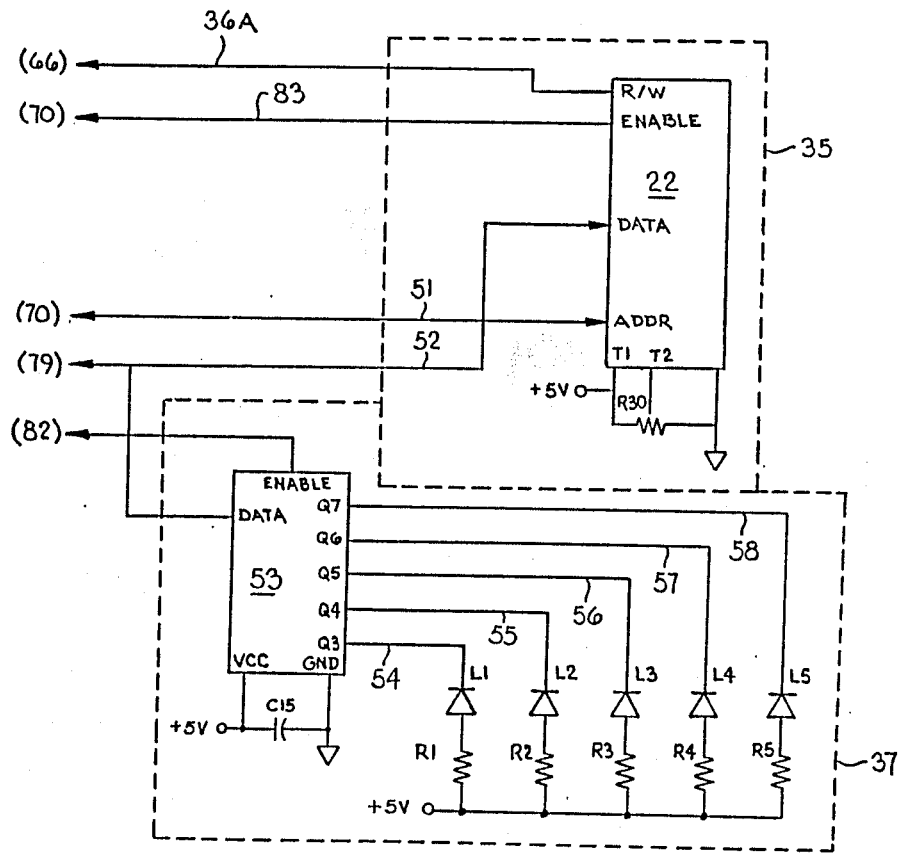
FIG. 6 is a diagrammatic representation of the display and indicator circuits depicted within the circuit of FIG. 3.
Figure 4:
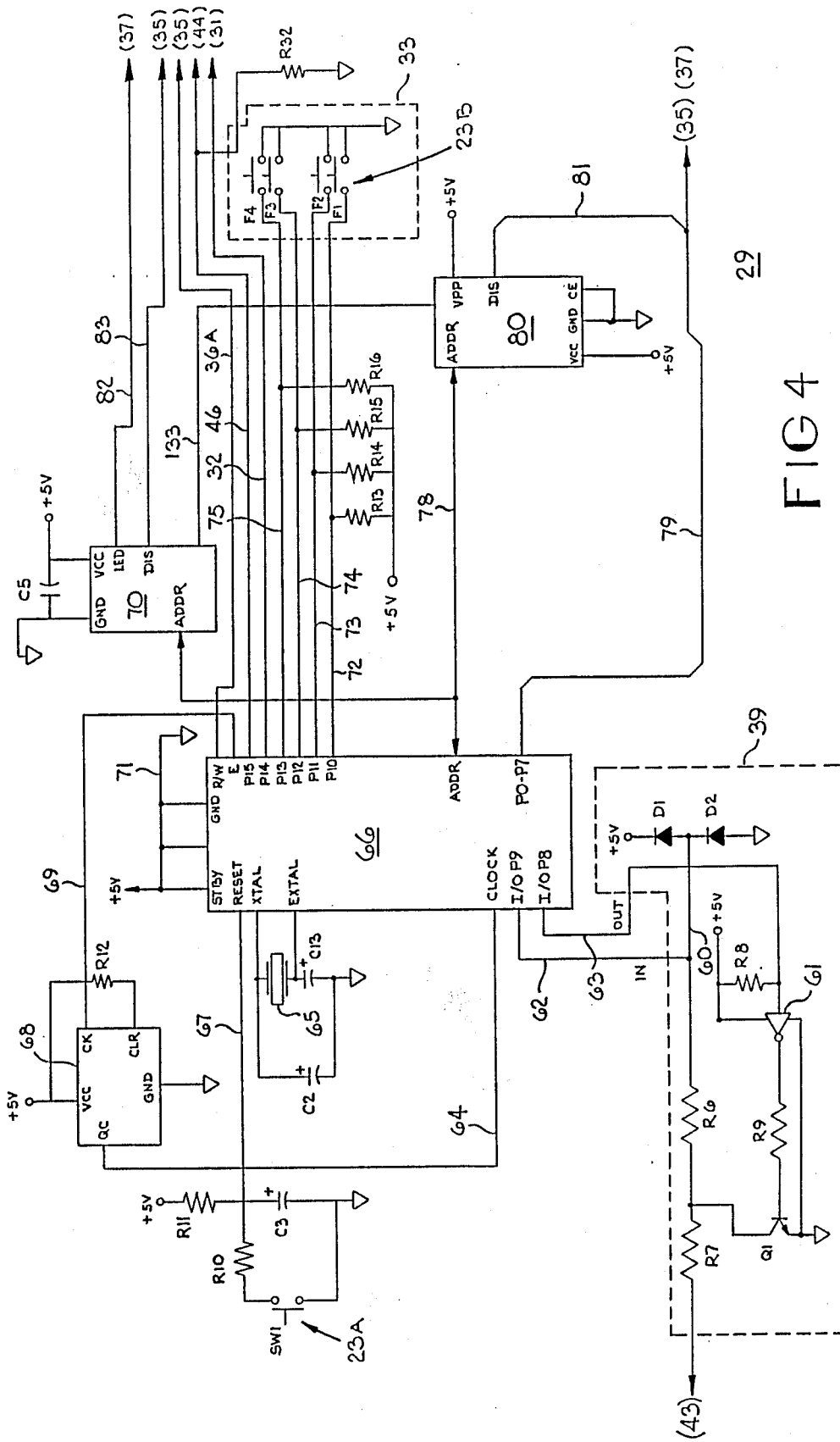
FIG. 4 is a diagrammatic representation of the digital communication circuit and microcomputer circuit contained within the circuit of FIG. 3.

The interconnection between the microcomputer circuit 29 and the digital communication, keyboard, indicator and display circuits 39, 33, 37 and 35, can be seen by referring now to FIGS. 4 and 6. The microcomputer circuit 29 includes a microprocessor 66 such as a type 6303 commercially available from Hitachi Corporation. A clocking signal is supplied to the XTAL and EXTAL ports by means of a crystal 65 and a clock circuit which includes capacitors C2 and C13. The communication circuit 39 connects with I/O ports P8, P9 of the microprocessor over the input and output conductors 62, 63. The input conductor 60 connects between a voltage source and ground by means of surge suppression diodes D1, D2 and with the digital programmer conductor 43 through current limiting resistors R6, R7. The output conductor 63 connects with the base of a transistor switch Q1 through an invertor 61 and a bias resistor R9. A pull-up resistor R8 insures that the communication channel is clear during power-up of the microprocessor, by forcing the input of the invertor 61 to a high state, forcing the output of the inverter to a low state thereto turning off the transistor switch Q1. A separate clock divider 68, which could include three cascaded flip flops for example (not shown), connects with the clock port on the microprocessor over a clock conductor 64. The clock terminal on the clock divider connects with the E-Port of the microprocessor by means of clock 69 conductor. The pull-up resistor R12 is connected to the CLEAR terminal of the clock divider to clear the communications clock upon power-up of the microprocessor 66. The microprocessor is reset manually by means of switch 23A in the form of a reset switch SW1 which connects through a current limiting resistor R10 and timing resistor R11 with the RESET port over the reset conductor 67. A timing capacitor C3 is connected across the reset switch in series with the timing resistor. The standby port connects with a source of standby power and ground cover conductor 71. The microcomputer connects with a decoder 70 such as a type 74HC138 from Texas Instruments Co. by means of address bus 78. The decoder is powered by connection between a voltage source and ground by means of capacitor C5. The LED and DIS output terminals of the decoder connect with the indicator and display circuits 37, 35 over output conductors 82, 83. Information to the decoder is supplied over address bus 78 which connects with the input terminal of the decoder and the address port on the microprocessor as well as with the address terminal on a 28 PIN EPROM 80. The keyboard circuit 33 connects with the microprocessor I/O ports P10-P13 over conductors 72-75 and pull-up resistors R13-R16. Function switches F1-F4 which connect between the pull-up resistors and ground are the switches 23B shown earlier in FIG. 2. The remaining I/O ports P14, P15 connect with the analog trip-circuit 44 and the power supply circuit 31 over the trip enable conductor 46 and the power supply status conductor 32 respectively. The I/O port P15 on the microprocessor and the analog trip enable conductor 46 are connected to ground through a current limiting resistor R32. The EPROM 80 connects with the decoder 70 over conductor 133. The EPROM connects with the microprocessor 66 by means of the data bus 79 which connects with the data port P0-P7 on the microprocessor. The data bus 79 connects the microprocessor data ports P0-P7 with the EPROM over conductor 81 and with the indicator and display circuits 37, 35. The microprocessor also connects with the display circuit 35 by means of the R/W port and conductor 36A.

Figure 5A:
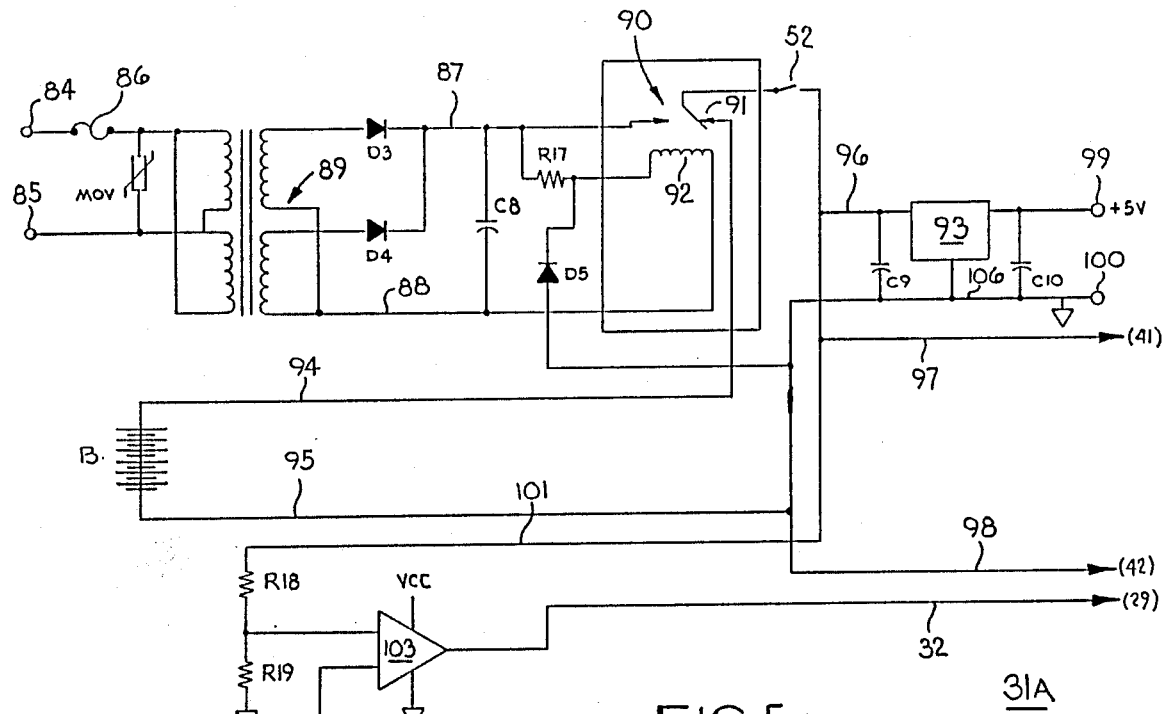
FIGS. 5A and 5B are diagrammatic representations of the power supply circuit, analog trip circuit and indicating circuits contained within the circuit of FIG. 3.
Figure 5B:
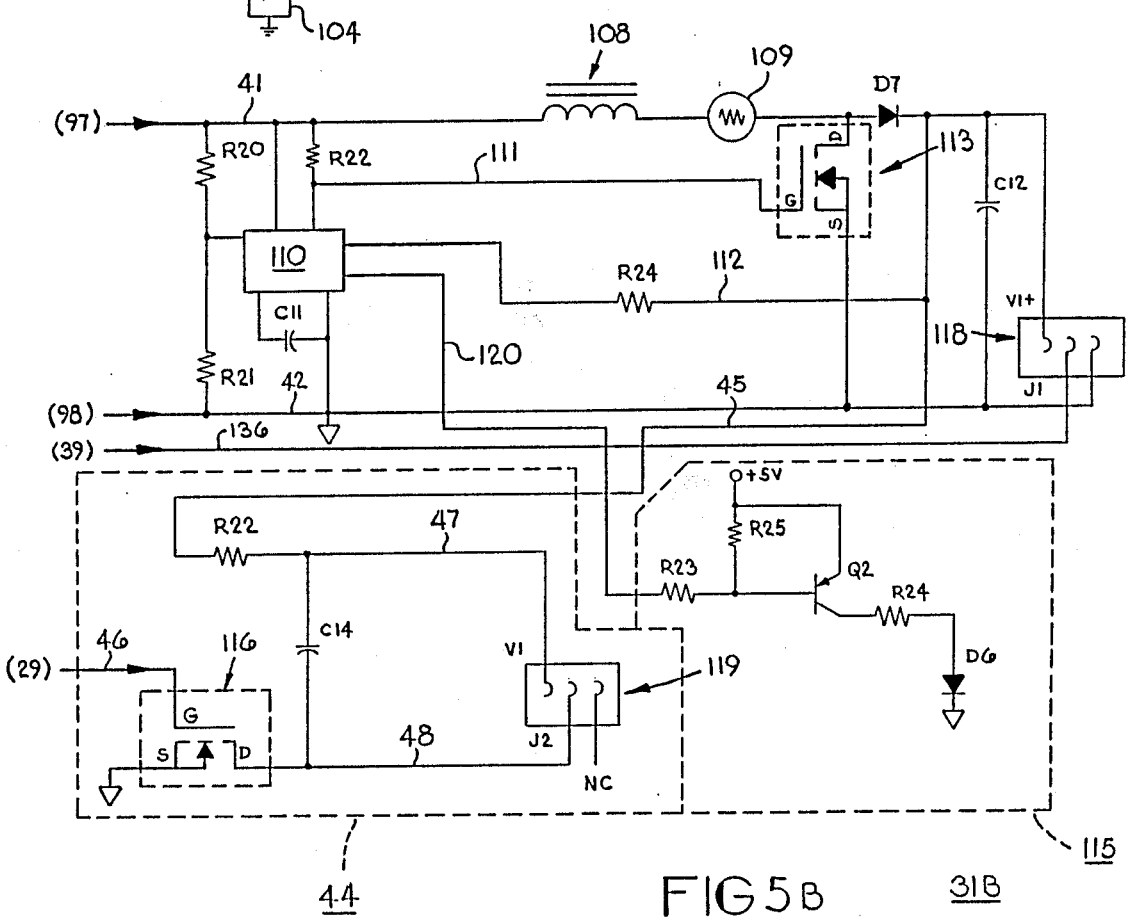

The input circuit 31A of the power supply circuit 31 is depicted in FIG. 5A and the output circuit 31B is depicted in FIG. 5B. Input power is provided by terminals 84, 85 which connect with the primary of a step-down transformer 89 through a fuse 86 and metal oxide varistor (MOV). The output of the transformer is connected through a pair of rectifying diodes D3, D4 and conductors 87, 88, to a filter capacitor C8 and bias resistor R17 to operate a relay coil 92. The contacts 91 of the associated relay 90 insure an uninterruptable voltage on bus conductors 96, 106 and 97, 98 by connecting the conductors 87, 88 electrically in parallel with a battery (B) by means of conductors 94, 95. The surge suppressing diode D5 protects the relay coil 92 from overvoltages during operation of the relay 90. An on-off switch 52 connects input power from the relay to bus conductor 97. Operating power is impressed on the power bus conductors 96, 106 which are electrically isolated from each other by means of filter capacitors C9, C10. Power bus conductor 96 connects with an output terminal 99 through a linear voltage regulator 93 while power bus conductor 106 connects with an output terminal 100 and ground. Ground bus conductor 98 is connected in parallel with ground bus conductor 106. The power bus 97 connects through conductor 101 and bias resistors R18 and R19 to the input of a comparator 103 for providing an output on the power supply status conductor 32 when the voltage on the input exceeds a reference voltage from a voltage source 104 connected to the other input of the comparator over conductor 105. Power bus conductors 41, 42 connect with a switching regulator 110 by means of voltage dividing resistors R20, R21 and pull-up resistor R22. Timing capacitor C11 connects between the switching regulator and ground. One input of the switching regulator 110 connects through a feedback resistor R24 and conductor 112 to the digital test jack 118. An output of the switching regulator 110 connects with the gate of a switching FET 113 over conductor 111 and from the source terminal of the FET to the digital test jack 118. Conductor 41 connects with the drain terminal of the FET and the digital test jack through an inductor 108, thermistor 109 and switching diode D7. Inserting the test plug connector 27 of FIG. 2 within the digital test jack opening 134 connects the digital test jack 119 with the communication circuit 39 of FIG. 4 over conductor 136 and the data bus 43. The thermistor 109 is an important feature of the invention which prevents overcurrent surges from damaging the test kit circuit during test, by rapidly responding to such overcurrent surge to limit the current on conductor 41 to a predetermined low current value. Conductor 45 connects the power conductor 41 with the drain terminal of the FET 116 through resistor R22 and capacitor C14 as indicated. The filter capacitor C12 connecting between conductors 41, 42 prevents any frequency components appearing on the conductors from entering the integrated circuit breaker trip unit circuit when connected to the test kit by means of the digital test jack 118. The low battery detector circuit 115 connects with the switching figure regulator 110 through conductor 120, first and second bias resistors R23, R25 and the base of a switching transistor Q2. The collector of the switching transistor connects with an LED D6 through a current limiting resistor R24 to indicate a low battery voltage condition. The analog trip circuit 44 connects with the microprocessor 66 of FIG. 4 by means of conductor 46 and through FET 116 and conductor 48 to the analog test jack 119. The storage capacitor C14 connecting across conductors 47, 48 stores charge and develops a voltage which is applied to the analog test jack 119.

The display and indicator circuits 35, 37 are shown in FIG. 6 and interconnect with each other and with the microcomputer circuit 29 of FIG. 3 in the following manner. The R/W terminal on the LCD 22 within the display circuit 35 connects with the R/W terminal on the microprocessor 66 over conductor 36A. The enable terminal on the LCD connects with the DIS terminal on the decoder 70 over conductor 83. The ADDRESS terminal on the LCD connects with the address port on the microprocessor through address bus 51 and the decoder 70. The DATA terminal on the LCD connects with the microprocessor data ports P0-P7 over the microprocessor data bus 79 and conductor 52. The data terminal on the LCD connects with the latch 53 in the indicator circuit 37 over data bus 52. The LCD is powered by a voltage source and bias resistor R30 connected with terminals T1 and T2. The latch 53 connected with the indicator circuit 37, electrically connects with bus 52 by means of the data terminal. The data terminal on the LCD 22 and the data bus 79 connect with the data port of the microprocessor 66 as described earlier. The enable terminal of the latch connects with the LED terminal on the decoder 70 within the microcomputer circuit 29 in FIG. 4 by means of conductor 82. The latch is powered by connection with a voltage source and a decoupling capacitor C15 connecting with the VCC and GND terminals. The LED's L1-L5 connect with a voltage source through corresponding bias resistors R1-R5, and with the corresponding Q3-Q7 terminals on the latch through conductors 54-58 respectively.

Figure 7:
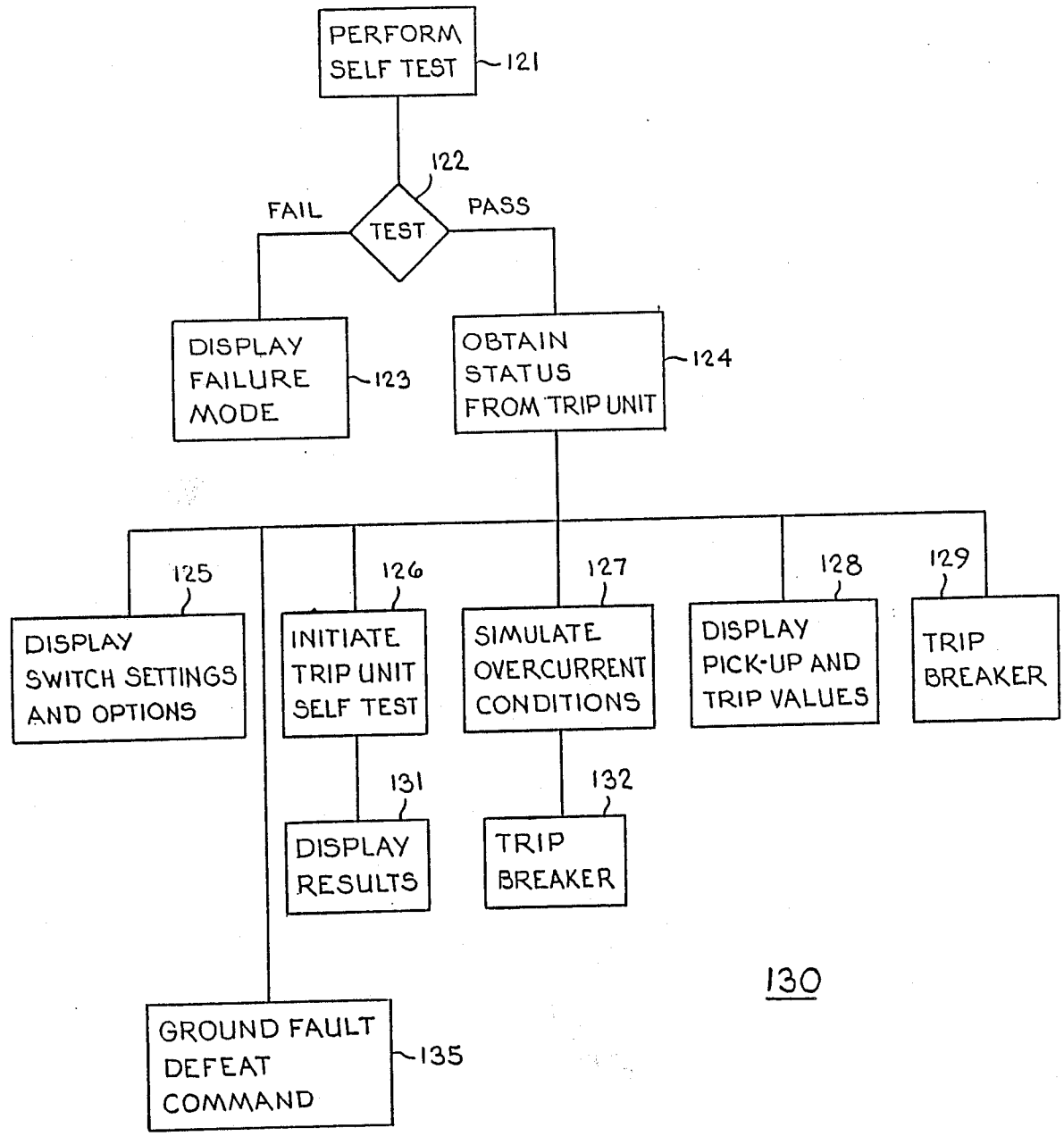
FIG. 7 is a flow chart representation of the operation of the microcomputer contained within the circuit of FIG. 3.

The operation of the test kit 20 (FIG. 2), for obtaining status and trip information from an integrated circuit breaker 10 by operation of the test circuit 30 generally described in FIG. 3, is depicted in the flow chart 130 in FIG. 7. For purposes of illustration, the integrated circuit breaker 10 of FIG. 2 is connected with the test kit by means of the analog test jack access opening 25 when the trip unit contains an analog signal processor and internal electrical connection is made with the analog trip circuit 44 shown in FIG. 5B by means of the analog test jack circuit 119. When a digital signal processor is contained within the trip unit of the integrated circuit breaker 10, the test kit becomes connected with the integrated circuit breaker by insertion of the test plug connector 26 within the separate digital test jack access opening 134. Internal connection is then made with the digital test jack circuit 118 contained within the power supply output circuit 31B shown in FIG. 5B. The test functions are initiated by pressing any of the appropriate buttons 23B on the test kit enclosure as shown in the flow chart format of FIG. 7. Upon power-up, the microcomputer 29 within the test kit circuit 30 of FIG. 3 performs a variety of self-test functions (121) similar to that described in the aforementioned U.S. patent application Ser. No. 626,341. The operation of the test kit is best understood by referring to both FIG. 3 and FIG. 7. Should the test kit fail the self-test (122), the failure mode is displayed (123) on the LCD 22 to alert the operator. Should the test kit pass the self-test (122), the status of the test kit (124) is displayed on the LCD 22. The operator at this time can then enter any of a plurality of functions by pressing the corresponding operation button 23B. One function being the display of the switch settings and options (125) contained within the integrated circuit breaker trip unit. Should the operator initiate a trip unit self-test (126) by pressing the designated button 23B the trip unit immediately performs a self-test and displays the results (131) on the LCD. Depressing another designated button 23B causes the test kit 20 to simulate an over-current condition (127) within the integrated circuit breaker optionally causing the integrated circuit breaker to trip (132). Another designated button 23B instructs the integrated circuit breaker trip unit to display selected pick-up and trip values (128) on the LCD. Another designated button 23B allows the operator to directly trip the integrated circuit breaker (129).

The ground fault defeat function (135) instructs the integrated circuit breaker trip unit to ignore ground fault protection during single-phase current injection testing. This allows the operator to perform overcurrent testing without tripping the integrated circuit breaker due to a ground fault condition.

A field operable integrated circuit breaker test kit has herein been described. The test kit operates on integrated circuit breakers containing analog as well as digital signal processors within their trip units. Further described is a ground fault defeat command which allows the integrated circuit breakers having ground fault sensing coils to become field-tested without tripping.

Having thus described my invention, what I claim as new and desire to secure by Letters Patent is:

1. A circuit breaker test unit comprising, in combination:

a trip unit circuit within an electric circuit breaker connecting with three-phase conductors of a three-phase electric circuit and interacting with an operating mechanism for interrupting said electric circuit when circuit current exceeds preselected values;

a test circuit within a test unit temporarily connected with said trip unit circuit;

a power supply circuit within said test circuit connecting with said trip unit circuit and supplying power to said trip unit circuit when said trip unit is in a test condition;

a microcomputer within said test circuit connected with said power supply circuit and a keyboard entry unit for inputting test parameters to said trip unit circuit;

a digital communication circuit within said test circuit connected with said microcomputer; and display circuit means on said test unit connected with said microcomputer and displaying test data information received from said trip unit circuit in response to said test parameters.

2. The test unit of claim 1 including an overcurrent protection element within said test circuit connected in series with said power supply circuit to protect said power supply circuit from current surges.

3. The test unit circuit of claim 2 wherein said overcurrent protection element comprises a positive temperature coefficient element.

4. The test unit of claim 3 wherein said positive temperature coefficient element comprises a thermistor.

5. The test unit of claim 1 wherein said microcomputer includes a ground fault inhibit program whereby a ground fault current signal on one of said phase conductors is deterred from otherwise causing said trip unit circuit to interrupt said electric circuit.

6. The test unit circuit of claim 1 including a power bus conductor and a ground conductor within said power supply circuit, and further including a first test jack electrically connected across said power bus conductor and said ground conductor for providing external electrical access to said power supply circuit, said first test jack being connected with said digital communication circuit through a separate communications conductor.

7. The test unit of claim 6 further including a second test Jack electrically connected with a pair of separate conductors from a test circuit for providing a trip signal to said trip unit circuit.

8. The test unit of claim 7 wherein said test circuit includes a resistor and a capacitor connecting with said pair of separate conductors for providing said trip signal.

9. The test unit of claim 1 wherein said trip unit circuit includes a digital processor.

10. The test unit of claim 1 wherein said trip unit circuit includes an analog processor.

11. A method of testing a circuit breaker trip unit comprising the steps of:

providing a test unit containing a test unit circuit;

temporarily connecting said test unit circuit to a trip unit circuit contained within a circuit breaker to institute a test condition;

connecting a power supply circuit within said test unit circuit to said trip unit circuit for supplying operating power to said trip unit circuit during said test condition;

displaying trip set points stored within said trip unit circuit on a display at said test unit;

inactivating ground fault trip response to said trip unit circuit; and providing a ground fault inhibit command to a digital processor within said trip unit circuit.

* * * * *